United States Patent [19]

Hickman

[11] 4,159,821

[45] Jul. 3, 1979

[54] COLLAPSIBLE DUAL-HEIGHT WORKBENCH

[75] Inventor: Ronald P. Hickman, Waltham Abbey, England

[73] Assignee: Inventec International Limited, Point Robert, Channel Islands

[21] Appl. No.: 781,841

[22] Filed: Mar. 28, 1977

Related U.S. Application Data

[60] Division of Ser. No. 642,742, Dec. 22, 1975, abandoned, which is a continuation of Ser. No. 511,017, Oct. 1, 1974, abandoned, which is a continuation of Ser. No. 277,118, Aug. 1, 1972, abandoned.

[30] Foreign Application Priority Data

Aug. 2, 1971 [GB] United Kingdom ............... 36269/71
Nov. 22, 1971 [GB] United Kingdom ............... 54165/71

[51] Int. Cl.² ........................ A47B 3/08; B25B 1/10; B25B 1/24
[52] U.S. Cl. .................... 269/139; 269/244; 269/261; 269/266; 269/321 CF
[58] Field of Search ........................ 269/309, 258–266, 269/279–284, 321 CF, 139, 244; 144/285–288; 108/91, 99, 117, 121; 182/141, 152, 155, 182

[56] References Cited

U.S. PATENT DOCUMENTS

| | | | |
|---|---|---|---|
| 394,026 | 12/1888 | Smith | 182/129 |
| 732,585 | 6/1903 | Reinhardt | 108/19 |
| 850,351 | 4/1907 | Crum | 182/153 |
| 893,875 | 7/1908 | Schneider | 269/321 N |
| 1,063,046 | 5/1913 | Lathrop | 144/286 R |
| 1,479,209 | 1/1924 | Topp | 144/288 R |
| 1,967,886 | 7/1934 | Johnson | 182/129 |
| 2,587,177 | 2/1952 | Larson | 144/286 |
| 2,983,308 | 5/1961 | Horowitz | 108/99 |
| 3,001,559 | 9/1961 | Szopo | 144/286 |
| 3,841,619 | 10/1974 | Hickman | 269/244 |

FOREIGN PATENT DOCUMENTS

| | | | |
|---|---|---|---|
| 819724 | 11/1951 | Fed. Rep. of Germany | 144/286 R |
| 1111118 | 7/1961 | Fed. Rep. of Germany. | |
| 1910977 | 9/1969 | Fed. Rep. of Germany. | |
| 547479 | 9/1922 | France. | |
| 1287657 | 2/1962 | France. | |
| 691444 | 2/1969 | South Africa. | |

*Primary Examiner*—Neil Abrams
*Attorney, Agent, or Firm*—Brumbaugh, Graves, Donohue & Raymond

[57] ABSTRACT

A workbench of a collapsible nature includes a top structure comprising a pair of vice members. These can either be spaced from a supporting surface in a first work-mode at saw-horse height or, by lowering of legs, in a second work-mode at full height. Each vice member is provided with two rows of cylindrical bores in which the shank portions of abutment members are axially, slidably received with a snug fit and are thereafter rotatable about a vertical axis to enable the gripping faces of the abutment members to self-align with a workpiece clamped between the abutment members.

52 Claims, 11 Drawing Figures

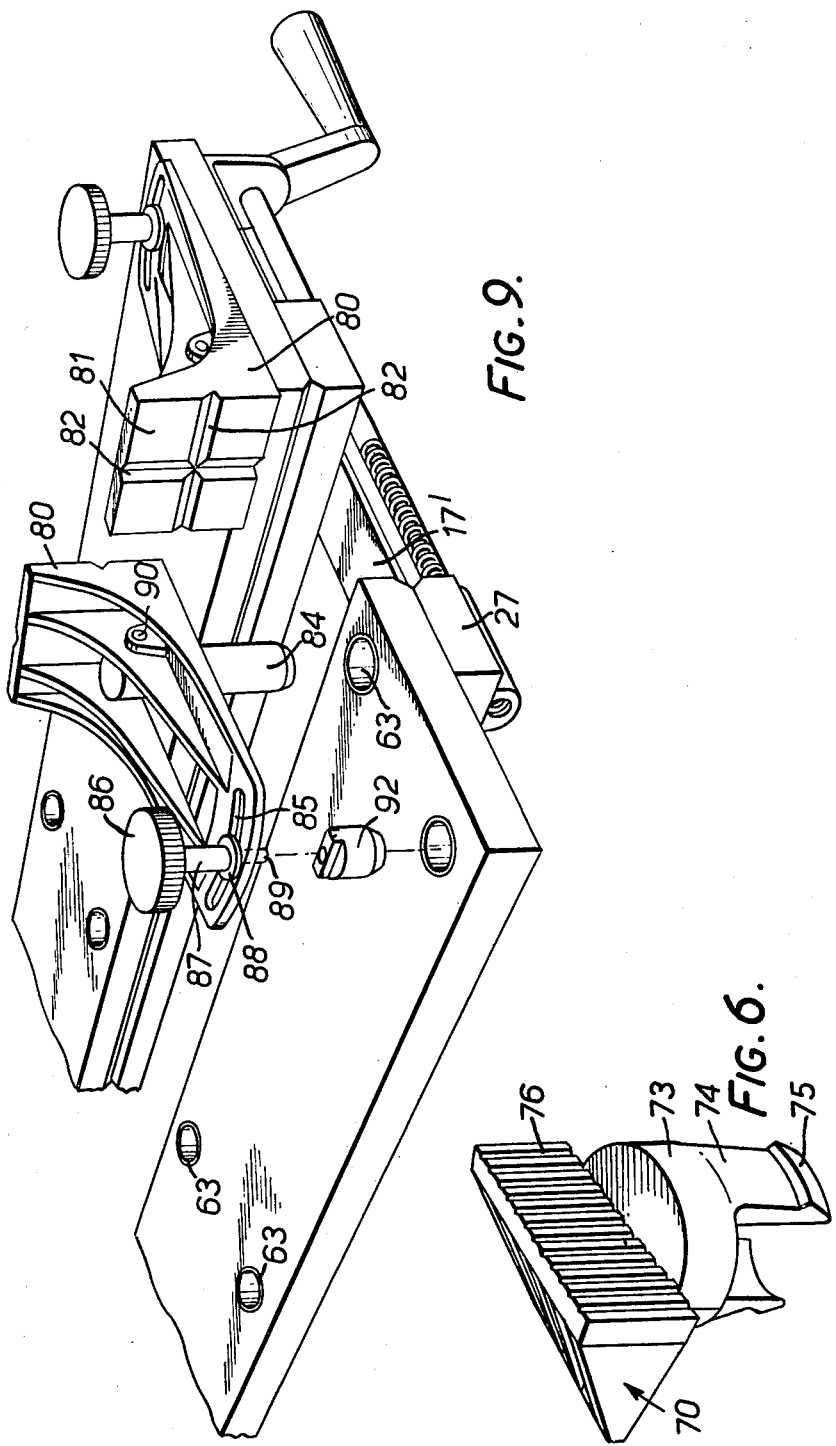

COLLAPSIBLE DUAL-HEIGHT WORKBENCH

This is a division, of application Ser. No. 642,742, filed 12/22/75, now abandoned, which was a continuation of appln. Ser. No. 511,017, filed 10/1/74, which in turn was a continuation of appln. Ser. No. 277,118, filed 8/1/72, both now abandoned.

THE FIELD OF THE INVENTION

This invention relates to workbenches and is concerned particularly with providing a dual purpose form of workbench whereby the working surface of the bench can be maintained in a rigid condition at alternative levels.

SUMMARY OF THE INVENTION

According to the present invention a workbench comprises top, intermediate and lower structures, a collapsible supporting structure adapted to maintain the top and intermediate structures in a first workmode condition with the intermediate structure acting as a floor level base, and the lower structure being adapted to maintain both the top and intermediate structures spaced above the floor in an alternative second workmode condition.

Preferably the supporting structure comprises at least one frame having its upper and lower ends pivoted respectively to the top and intermediate structures such that in a collapsed condition the top structure is juxtaposed the intermediate structure for storage or transportation.

The lower structure may include one or more legs which can either be detached to obtain the first workmode condition or be pivoted to the intermediate structure for movement between storage and operative positions.

According to a further specific aspect of the present invention the floor contact area of the lower structure in the second workmode is substantially greater than the floor contact area of the intermediate structure in the first workmode. The term "floor contact area" in this context means in either case the floor area encompassed by a perimeter line drawn around the outermost points of floor contact. This aspect ensures that, as the workbench is converted from its first workmode, to its second workmode, so increasing its height, the contact area between the workbench as a whole and the floor is substantially increased in order to give it corresponding stability.

The top structure may comprise a bearing structure, bearing a pair of top members forming a vise and having upper surfaces lying in substantially the same plane, at least one of the top members being movable with respect to the other to cause opposed substantially vertical faces thereof to be moved relatively towards and away from one another, said movement being caused by actuation of one or both of a pair of spaced clamping devices which are capable of independent operation to permit the gap between the vertical faces to be greater at one end than at the other.

The intermediate structure may incorporate a pair of spaced side frames disposed substantially parallel to one another and having opposed surfaces between which the collapsible supporting structure is pivoted, a platform extending between the side frames adjacent their forward ends, the lower structure including a pair of rear legs connected at their upper ends by a transverse upper section pivoted at its ends to each of the said opposed surfaces, about an axis at right angles to the side frames and two front legs one pivoted to each of the side frames about axes extending parallel to the side frames. The rear legs may be formed as two limbs depending, one at each end, from a laterally extending rear cross member connecting their upper ends, with each adapted to contact the floor at a region rearward of the rear end of the adjacent side frame.

DESCRIPTION OF THE DRAWINGS

FIG. 6 is a form of plug-in swivelling stop for use with the workbench;

FIG. 9 shows the form of a metal-worker's vise and its mode of attachment to the workbench;

DESCRIPTION OF THE PREFERRED EMBODIMENT

Figure 1:
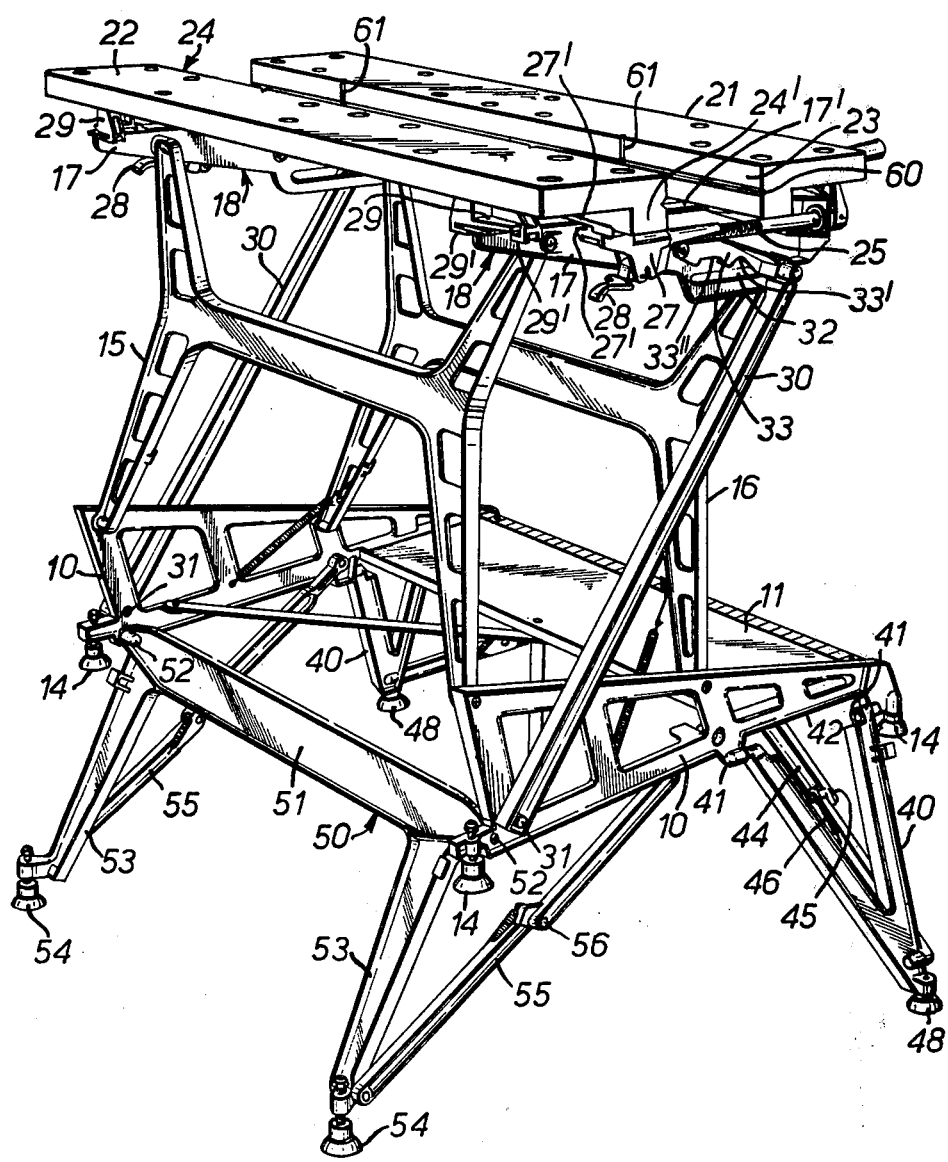
FIG. 1 illustrates a collapsible workbench according to the present invention the bench being shown in a high workmode condition.
Figure 2:
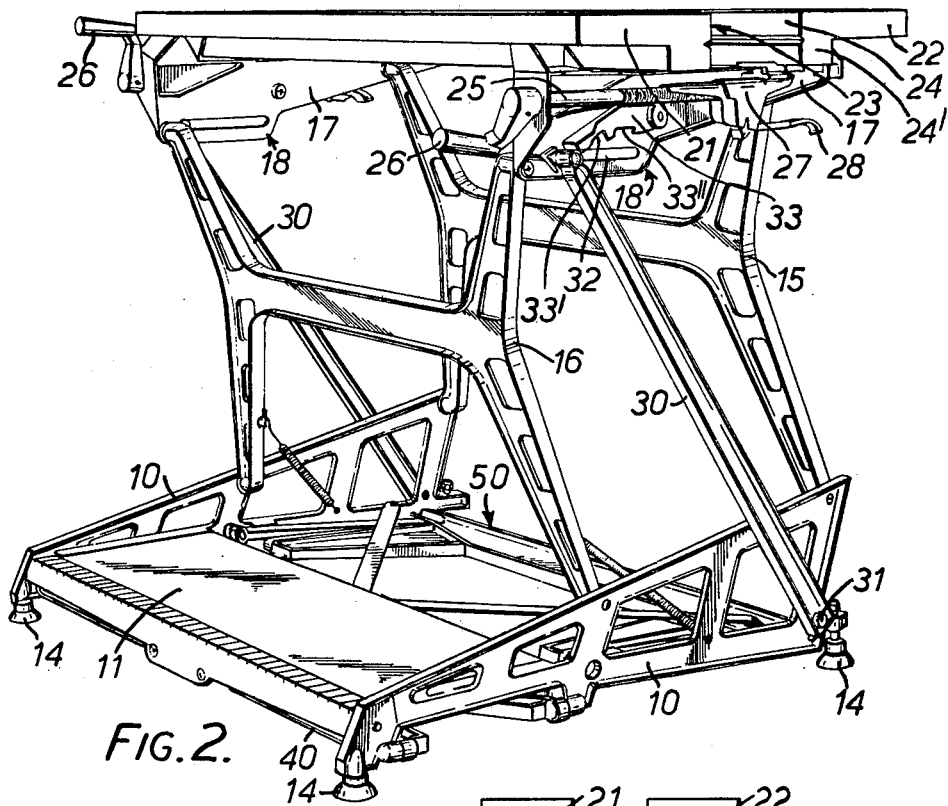
FIG. 2 illustrates the workbench of FIG. 1 in a low workmode condition.

Referring firstly to FIG. 1 this discloses a pair of lateral frames 10 which, together with a base board 11, provide what can be termed as "an intermediate structure" but which for a first workmode condition of the bench, shown in FIG. 2, provides a base adapted to rest on the floor by means of four adjustable feet 14. Pivotally connected to the frames 10 are a pair of H-shaped frames 15 and 16 formed as castings, the upper ends of which are pivotally connected to vertical webs 17 of two generally T-shaped side members 18, horizontal webs 17' of which carry the top structure of the workbench.

This top structure incorporates a pair of spaced laminated timber beams 21 and 22 of inverted L-section and having their horizontal surfaces aligned in the same plane. The beams have opposed vertical surfaces 23 and 24, respectively, which form a vice. It will be observed that the beams have thickened or deeper portions 24' adjacent their faces 23 and 24. The front beam 23 is secured rigidly to the side members 18 whilst the rear beam 22 can be moved towards and away from the beam 23 by means of a pair of clamping screws 25 each of which has a cranking handle 26. The rear end of each screw 25 engages in a nut member 27 secured to the underside of the thickened portion 24' of the rear beam 22 by means of single vertical pivotal connection which permits angular operation of these clamping devices substantially as described in U.S. Pat. No. 3,615,087. The devices are so arranged that one can operate independently of the other in order that the faces 23 and 24 can be clamped up in an angular manner to grip differently shaped workpieces. Each nut member 27 incorporates a quick release lever 28 at its rear end and also has a pair of horizontal flanges 27' which engage one under and one over the horizontal web 17' of the adjacent side member 18. The rear beam 22, adjacent its rear underside carries two guide members 29 arranged to co-operate one with each of the side members 18. For this purpose each guide member 29 rests on the horizontal web 17' but has a pair of opposed horizontal flanges 29' which extend under the web 17' to prevent upward movement of the beam 22 away from the side member 18 and yet permit limited displacement as is required during angular clamping operations.

In FIG. 2 the workbench is maintained in its first workmode condition by means of a pair of diagonal braces 30 pivoted at their lower ends by pivotal connections 31 to the respective frame 10. Each brace is connected loosely at its upper end to a slot 32 in the adjacent web 17 and retained at the front end of the slot by means of a pivoted latch 33. The latch is sprung biassed downwards to the latched position of FIGS. 1 and 2 in which the end of the latch obstructs rearward movement of the upper end of the brace 30. Each latch has a pair of notches 33' and 33" the first of which acts as a secondary catch in the upright open condition of the bench and the second of which engages the upper end of the brace 30 in the collapsed condition of the top structure to prevent it falling open during transportation. The latch thus serves a dual function. When it is desired to collapse the workbench in order to bring the top structure in close juxtaposition to the base structure, the latch 33 is lifted and the two frames 15 and 16 can then be collapsed one upon the other.

In FIGS. 1 and 2 three leg structures are shown which form the means by which the workbench is maintained in its second workmode condition. The leg structures include a pair of V-shaped front legs 40, the upper ends of which are pivoted about horizontal axes 41 to cut out regions 42 of the frames 10. Each leg 49 has a brace 44 formed in two halves pivoted together at 45 and also interconnected by a spring 46 which maintains the two halves in an 'over-centre' condition in FIG. 1 and also, when the legs are pivoted upwardly beneath the base board 11 as shown in FIG. 2, maintains the legs in their retracted position beneath the base board. Each leg 40 carries a rubber foot 48.

A single rear leg 50 is included which is of generally inverted U-shape having a horizontal limb 51 extending between pivots 52 at the rear corners of the two frames 10 and downwardly extending limbs 53 each carrying a further, adjustable, foot 54. Extending upwardly from the lower end of each arm 53 is a brace 55, similar to the brace 44, and again formed in two sprung sections hinged at 56.

Figure 3:
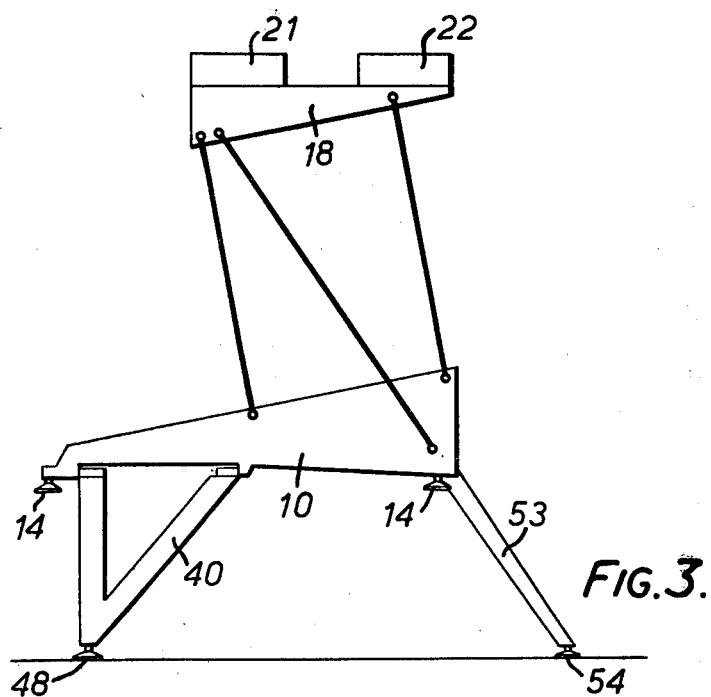
FIG. 3 is a diagrammatic side elevation of the workbench of FIG. 1.
Figure 4:
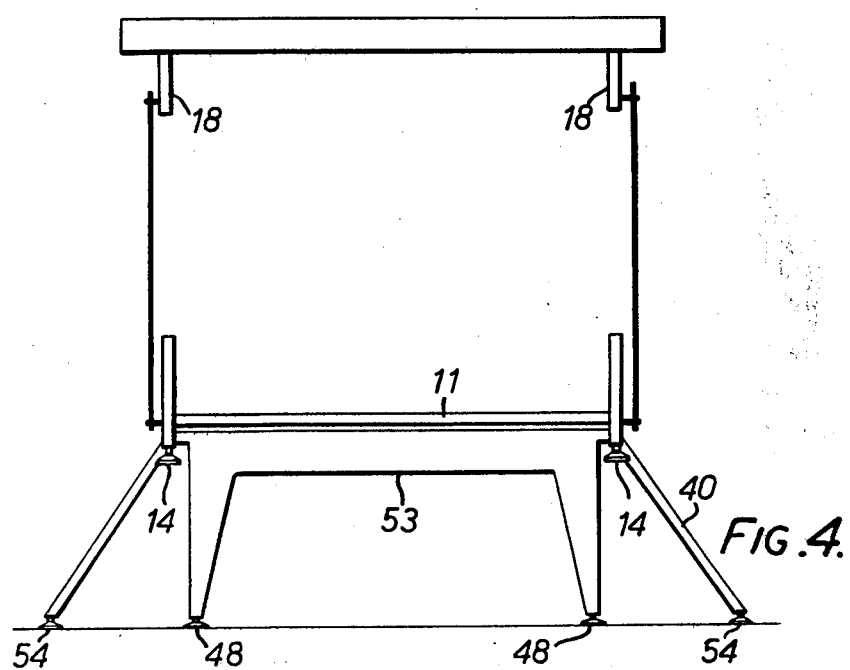
FIG. 4 is a diagrammatic front elevation of the workbench of FIG. 1.

It is to be particularly noted, for example with reference to FIGS. 3 and 4, that the floor plan area embraced by the four adjustable feet 14 in the first workmode condition is substantially increased when the legs 40 and 53 are lowered since the floor area embraced by the two forward feet 48 and the two rearward feet 54 is substantially greater than the area embraced by the feet 14. In this manner the weight of the workbench as a whole is distributed over a considerably greater area than in its first workmode condition. This provides the workbench with corresponding stability as its height is increased. Whilst, in the particular configuration shown, all four supporting corners of the bench are moved outwards as the height is increased, it might in some instances suffice for, say, only the front feet to be splayed out in the higher mode.

Increased stability could also be obtained by providing the bench with a further base-board of considerable area for the second workmode condition, and to which the bench could be releasably fixed.

The construction of workbench so far described is very versatile. It can be used in its first workmode condition of FIG. 2, for example with the upper surfaces of the beams 21 and 22 at normal saw-horse height. This is very convenient for many operations. If, however, a full work bench height is required, the retractable legs can be lowered to produce the second workmode condition of FIG. 1 in which the height of the workbench is for example 32 inches.

Figure 5:
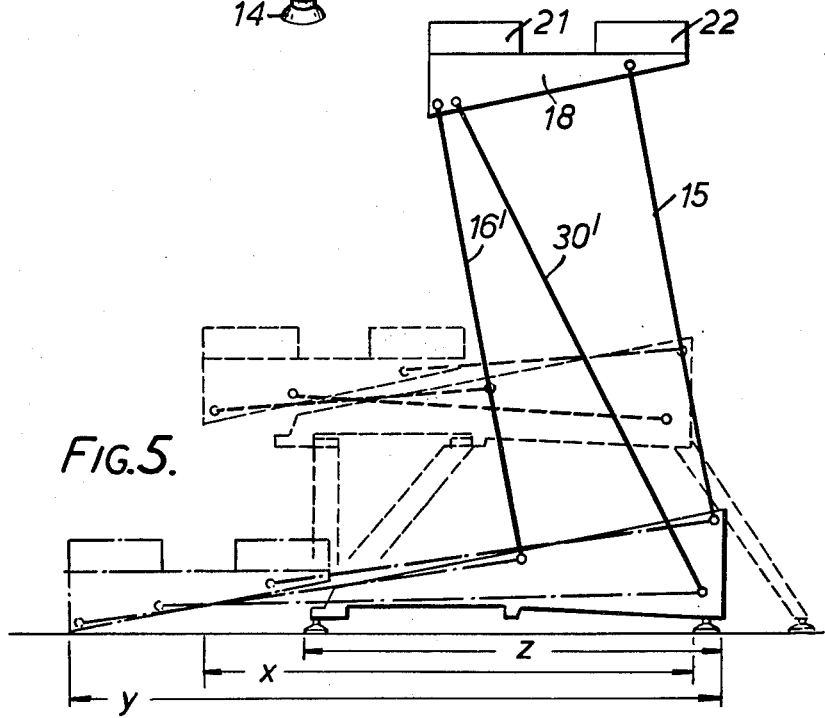
FIG. 5 is a diagram illustrating certain advantages of the present invention.

The bench as a whole has two stages of collapse from the FIG. 1 condition. On the one hand the top structure can be pivoted with respect to the frame 10 to the dotted line position shown in FIG. 5, and secondly, the retractable legs 40 and 53 can be retracted beneath the base board 10, as shown in FIG. 2. FIG. 5, for comparison purposes, also shows a construction, not according to the invention.

Thus if as shown in full lines in FIG. 5, the legs 40 and 53 are omitted, and the frames 15', 16' and the braces 30' are appropriately lengthened, with the frames 10 remaining at floor level, the fully collapsed condition of the bench is as shown in chain-dotted lines. In such a case the collapsed dimension 'x', of the construction according to the invention is increased to 'y' which is very little less than the full height of the bench and would provide a cumbersome construction. Therefore, the two stages of collapse according to the invention provide for considerable economy in space and ease of handling. The collapsed structure, according to the invention, is extremely light and can be readily carried in one hand. This would not be possible with a construction such as that of the full line arrangement of FIG. 5. Furthermore, FIG. 5 illustrates a further advantage of the present invention in that, in the FIG. 5 construction, the front to back depth 'z' (nor the lateral width) of the base is not altered for the high workmode condition and, as a consequence, the construction of FIG. 5 would be relatively unstable as compared with that of FIG. 1.

The provision of a pair of front legs 40 having pivotal axes which are at right angles to the pivotal axis of the rear leg 53 provides for considerable stability in the second workmode since the two front legs 40 are ideally positioned to take loads from left to right, as the workbench is viewed from the front, whilst the three legs, namely the two front legs 40 and the rear leg 53, can also readily accommodate forward and rearward loads.

The opposed surfaces 23 and 24 of the beams 21 and 22 respectively are each provided with a longitudinal "V" groove 60 and a pair of vertical "V" grooves 61 to enable workpieces which are not flat, e.g., tubes or the like, to be securely held by the vise either in a horizontal or a vertical manner.

Each of the beams 21 and 22 is provided with two parallel rows of vertically extending circular holes 63 which extend the full depth of the beams. The precise number and arrangement of holes 63 can vary according to requirements, but one arrangement is shown in FIG. 1, a second in FIGS. 7 and 8 and a third in FIGS. 9, 10 and 11. Each beam may also be provided with one or more horizontal holes of limited depth in each of its end faces. Where the beams 21 and 22 are formed of wood (e.g. laminated wood) the holes 63 are preferably provided with metal linings, e.g. of steel or aluminium.

The purpose of the holes 63 and 64 is to enable the two beams 21 and 22 to be used either alone or together for a variety of purposes, many of which incorporate a cramping or stretching action which can be obtained by use of one or both of the clamping screws 25.

FIG. 6 shows one form of swivel type stop attachment 70 which can be plugged into any one of the holes 63 as desired. For this purpose the stop 70 may be formed from nylon having a cylindrical plug-in section 73 and two depending flexible lugs 74 each of which is provided with a rib 75. Surmounting the plug-in section 73 is a stop section 76 having a vertical face provided with a number of vertical ribs.

Figure 7:
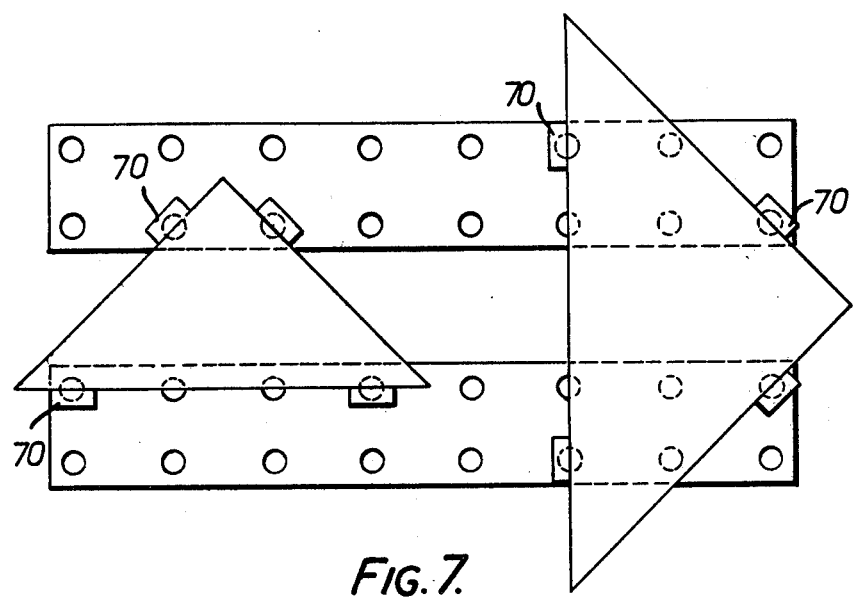
FIGS. 7 and 8 illustrate diagrammatically the manner in which workpieces may be secured to the vise members by use of a number of stops of the type shown in FIG. 6.
Figure 8:
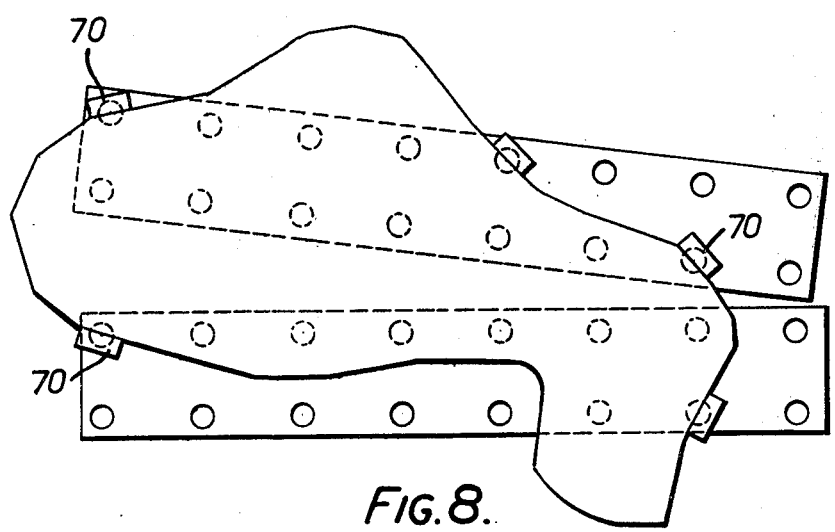

In practice a considerable number of the stops of the form shown in FIG. 6 can be employed at any one time depending upon the workpiece intended to be held by the workbench. When not required they can be stored by insertion from below into the holes 63 adjacent the vise faces. FIGS. 7 and 8 illustrate the manner in which regular or irregular shaped workpieces can be clamped up by using a number of the stops of the type shown in FIG. 6. Each stop is capable of turning automatically about a vertical axis within a hole 63 in the top of the bench in order to adopt the desired alignment with respect to the workpiece. It will be apparent from FIGS. 6 and 7 that in some cases the beams of the workbench will be clamped up in a parallel manner and in other cases in an angular manner.

It is to be understood that the form of stop illustrated in the drawings could be associated in some cases with a workbench having a vise top in which the beams are only capable of parallel adjustment. Whilst in some cases this would restrict the scope of use of the stops there will be many cases in which parallel vise adjustment is adequate for the swivelling stops to be positioned correctly for holding regular and irregular shaped workpieces. It is to be noted from FIGS. 6 and 7 that in some cases the swivelling type stops are located in holes of the outer row of a vise beam and in other cases in holes of an inner row.

The stops can also be used in association with the workbench without using the vise top facility of the workbench. For example a pair of stops may be located in holes in a single beam of the bench in effect to provide a form of "bench hook" during the sawing of a plank. At this time the beams of the bench may be drawn up as required in order to permit the plank to rest across the gap between the beams and, of course, the beams could, if desired, be drawn up right against one another.

FIG. 9 illustrates the detail of the form of a two-part metal-worker's vise capable of attachment to the workbench. Each part includes a casting 80, the forward face 81 of which is formed with two intersecting "V" shaped grooves 82. Just to the rear of the face 81 the casting 80 has a steel pin 84 which can be located in one of the holes 63 in one of the beams of the vise. This will generally be in one of the holes adjacent the vise face. The pin 84 is pivoted to the casting 80 by a horizontal pivot pin 90. The casting has, spaced from the steel pin 84, an arcuate slot 85 which receives a clamping member comprising a knob 86 secured to the upper end of a rod 87 which carries an integral flange 88, and has a lower, reduced diameter threaded portion 89. The portion 89 engages in a threaded bore of a peg 92 which engages in another of the holes 63 in the beam of the vise. The peg 92 is thus located beneath the casting 80 but can be clamped in any desired position with respect to the arcuate slot 85 by means of the knob 86. In this way, once the pin 84 and peg 92 are located in two adjacent holes of a vise beam the vertical face 81 of the metalworker's vise can be manually moved about the vertical axis of the pin 84 to a desired position in which it can be clamped. Alternatively, when not clamped, the vise parts 80 can be caused to rotate by a workpiece of an irregular shape as it is clamped up by clamping devices 25. When clamping up takes place, there is a tendency for the pin 84 to be tilted. This causes it to bind in the aperture 63 so as to prevent upward withdrawal, but does not prevent swivelling if required.

Figure 10:
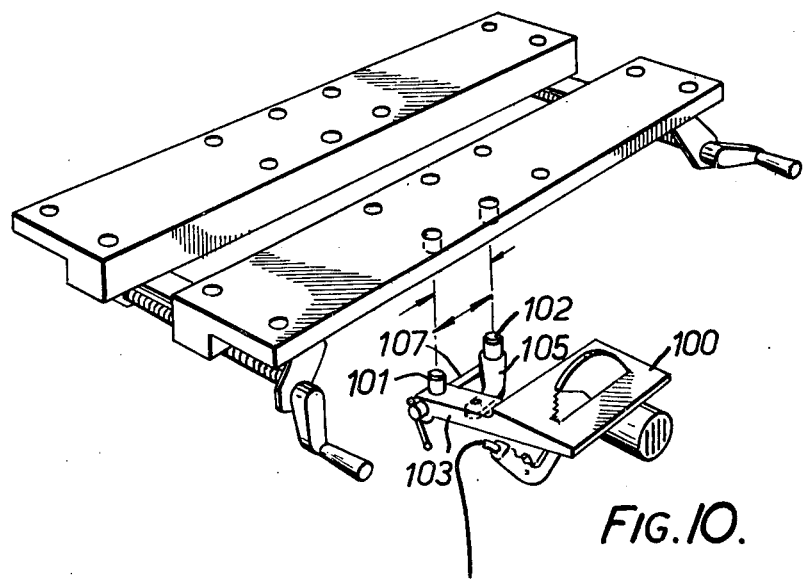
FIG. 10 illustrates the attachment of a saw-table to the workbench.
Figure 11:
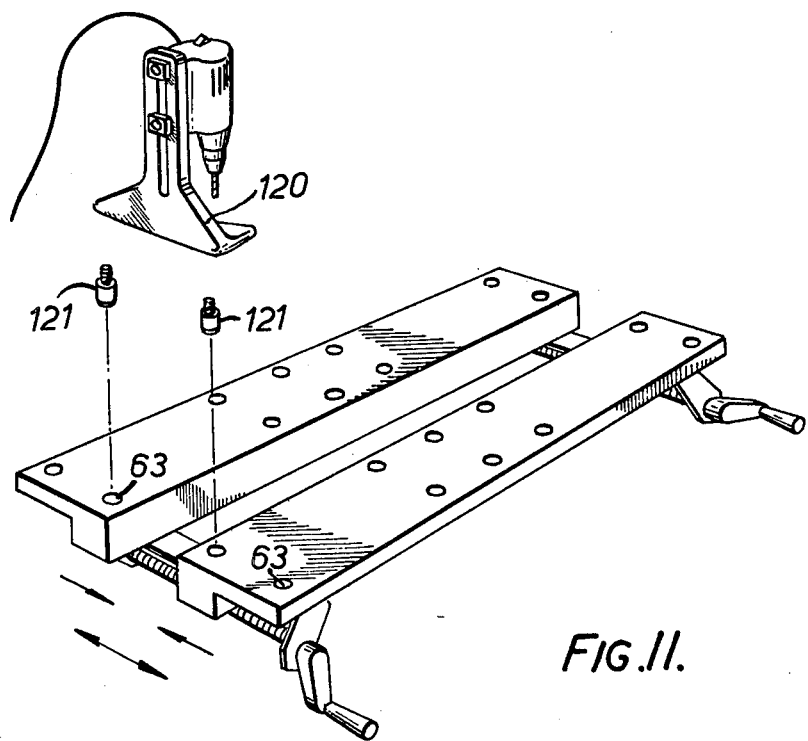
FIG. 11 illustrates the attachment of a drill to the workbench.

Whilst all embodiments so far described envisage the use of pegs or the like which extend into the upper ends of the holes 63, this is by no means essential. The holes can extend completely through the vise beams and can permit tools to be secured by means of pegs extending into the holes from below, for example, as indicated in FIG. 10 which shows the manner in which a saw table 100 can be mounted with respect to one of the beams by means of a pair of upwardly extending pegs 101 and 102. The peg 101 is connected to a rigid part 103 carried by the saw table. The other peg 102 is mounted on a pivoted arm 105 which is interconnected with the rigid part 103 by means of screw threaded rod 107 in order to move the two pegs 101 and 102 towards or away from one another to secure the device rigidly to a single vise beam. Incidentally, this leaves the vise structure still available for use.

FIG. 9 illustrates diagrammatically the manner in which a tool such as a drill-stand 120 (which may be a standard item) can be rigidly connected to the vise structure by means of a pair of downwardly extending adaptor pegs 121 arranged to be screwed into the underside of the drill-stand and to extend one into each of the forward rows of holes 63 in the two vise beams. Thereafter the vise beams can be either drawn apart or clamped together as indicated by the arrows to the desired extent to hold the pegs 121 firmly in position.

It should be stressed that whilst all the constructions so far described and shown include vise structures which have substantially vertical faces capable of use as a vise by themselves, where a structure is intended only to be used to support or locate tools or workpieces by means of the apertures in the horizontal surfaces of the beams, the vertical faces are not actually required and need not, therefore, be included.

A further application of this vise structure is for use in forming shaped articles. For example a pair of curved jigs could be clamped one to each of the vise beams in order to provide any desired configuration for the forming of a laminated structure. Equally the clamping or tensioning action of the beams can be utilised not only for forming but for punching or cutting purposes by mounting the appropriate tools or formers on the vise beams.

Where desired the pegs or stops which are located in the holes of the vise beams can be of an expanding nature in order to provide for extremely rigid location, for example in the manner of a chuck. Alternatively, a keyhole type of location can be provided.

What I claim as my invention and desire to secure by Letters Patent is:

1. A workbench comprising
   a top structure, including (a) a vise structure incorporating a pair of vise members having elongate clamping faces and having upper surfaces lying in substantially the same plane, and (b) vise operating means arranged to move the vise members positively relatively toward and away from one another;

at least one row of at least two smooth cylindrical walls formed in one of said vise members and defining two smooth-walled cylindrical bores having axes perpendicular to said plane, said cylindrical walls opening through the upper surface of said one vise member and defining therein at least one row of at least two circular apertures, said row extending generally parallel to the direction of elongation of the clamping face of said one vise member;

at least one smooth cylindrical wall in the other vise member defining a smooth cylindrical bore having an axis perpendicular to said plane, said cylindrical wall opening through the upper surface of said other vise member and defining therein a circular aperture;

a plurality of abutment members each having a shank portion snugly, slidably and swivelably receivable in said cylindrical bores and having an abutment portion projecting above said plane, said abutment portion presenting a workpiece-engaging planar surface parallel to the axis of said bore;

convertible support means, including a horizontal structure and a first set of legs pivotally connected thereto, for supporting said workbench top structure in a first workmode condition at sawhorse height when said first set of legs are folded up and for supporting said workbench top structure in a second workmode condition at workbench height when said first set of legs are folded down;

an additional set of legs connected to said top structure and said convertible support means, and collapsible between a storage condition, in which the top structure and additional set of legs are juxtaposed, and said first workmode condition, in which the top structure and said convertible support means are vertically spaced and said horizontal structure is a floor level foot-thrust member.

2. A dual-height, collapsible workbench, comprising: top, intermediate, and lower structures;

said top structure incorporating two elongate members having upper surfaces which lie in substantially the same plane to form a working surface, and which are relatively movable to form a vise, and a pair of spaced vise operating devices for moving the vise members relative to one another;

a foldable supporting structure arranged, in an erected condition, to maintain the top and intermediate structures separated in a first workmode condition with the intermediate structure acting as a floor-level base;

said lower structure incorporating legs which are retractable by pivoting inwardly under the intermediate structure in said first workmode condition, but which, when extended, are adapted to maintain the top and intermediate structures spaced above the floor in an alternative second workmode condition.

3. The workbench of claim 2 wherein each vise member has a plurality of spaced bores opening through its upper surface, each of which is adapted to receive snugly a rotatable abutment member having a workpiece-engaging surface lying above the upper surface of the vise member.

4. The workbench of claim 2 wherein the intermediate structure includes a platform which, in the erected condition of the foldable structure, is at least partly disposed in front of the top structure.

5. A collapsible, dual-height workbench adapted to be erected in a free-standing manner on a floor, comprising:

a top structure including two elongate beams spaced apart in the direction transverse to the direction of elongation to form an elongate gap therebetween, the upper surfaces of said beams defining substantially the entire working surface of the workbench;

a collapsible supporting structure including (a) two front legs and two rear legs connected to the top structure for folding between a collapsed condition and an erected condition and (b) a cross member connected to said front legs adjacent the lower ends thereof and extending between said front legs in said direction of elongation;

first floor-contacting means connected to the collapsible supporting structure for supporting said rear legs over the floor when said collapsible supporting structure is in the erected condition;

second floor-contacting means connected to the collapsible supporting structure for supporting said front legs over the floor when said collapsible supporting structure is in the erected condition;

said first and second floor-contacting means including first and second pairs, respectively, of lower legs, said first and second pairs of lower legs being mounted for pivotal movement about the upper ends thereof between a retracted condition, in which said first and second floor-contacting means support said top structure at substantially sawhorse height above the floor and in which said cross member lies adjacent the floor level and provides a foot surface on which the user can exert his weight to stabilize the workbench during use, and an extended condition, in which said first and second floor-contacting means support said top structure at substantially full workbench height above the floor and in which the foot surface provided by said cross member is located above the floor by substantially the differential between sawhorse height and full workbench height, whereby the top structure is at sawhorse height relative to a user standing on said cross member.

6. The workbench of claim 5 wherein said first and second floor-contacting means, when said lower legs are in the retracted condition, define a first floor-contact area and, when said lower legs are in the extended condition, define a second floor-contact area, said second area being substantially larger than said first area.

7. A collapsible, combined workbench and sawhorse adapted to be erected in a free-standing manner on a floor, comprising:

a top structure, including laterally elongated front and rear beams having upper surfaces defining a substantially planar working surface and a pair of laterally spaced-apart hand-operable devices for moving said beams towards and away from one another in the plane of said working surface to form a vise;

collapsible leg means, including laterally spaced-apart front legs and laterally spaced-apart rear legs, connected to said top structure for folding relative thereto between an erected condition, in which said leg means extend generally downward from said top structure and support said working surface in a substantially horizontal plane at substantially full workbench height above the floor, and a storage condition, in which said leg means extend generally parallel to said working surface in juxtaposition to said top structure to form a compact storage configuration; and platform means pivotally connected to and extending laterally between said spaced-apart front legs for folding relative thereto between a use position, when said leg means are in the erected condition, in which said platform means defines a generally horizontal foot platform which is located at least in part forwardly of a plan projection of said working surface and which is at a height above the floor substantially equal to the differential between sawhorse height and full workbench height, and a storage position, when said leg means are in the storage condition, in which said platform means extends generally parallel to said leg means, said leg means when in the erected condition having floor-engaging portions inclined downwardly and outwardly of said platform means so as to define a floor contact area that is substantially larger than the horizontal cross-sectional area encompassed by said leg means and said platform means at the level of said horizontal foot platform.

8. The combined workbench and sawhorse of claim 7 wherein each elongate beam has a plurality of spaced bores opening through its upper surface, each of which is adapted to receive snugly a rotatable abutment member having a workpiece-engaging surface lying above the upper surface of the beam.

9. A collapsible, dual-height workbench adapted to be erected in a free-standing manner on a floor, comprising:

a top structure, including front and rear relatively movable vise members having elongated clamping faces and affording a suubstantially planar working surface;

convertible support means, including intermediate structure and lower structure;

a collapsible supporting structure interconnecting said top structure and said support means and extensible between a storage condition, in which the top and intermediate structures lie in juxtaposed planes, and an erected condition, in which the top and intermediate structures are vertically spaced apart with the intermediate structure adjacent the floor level and the working surface lying in a substantially horizontal plane above said intermediate structure;

said intermediate structure including means providing, when said collapsible supporting structure is in said erected condition, a substantially horizontal surface lying at least partly forward of the vertical projection of the front edge of the front vise member and adapted for the user to place his foot thereupon to stabilize with his weight the workbench in said erected condition;

said lower structure including a plurality of legs, each pivotally attached at one end to said intermediate structure and each having at the other end thereof a floor-contacting free end, said legs depending from said intermediate structure and being foldable between a first workmode condition, in which the free ends of said legs are folded up beneath said intermediate structure out of contacting relation with the floor, and a second workmode condition in which the free ends of said legs are folded down from said intermediate structure to an extended position in which they are adapted to contact the floor to support the workbench thereon; and means mounted on at least one of said intermediate structure and said lower structure for, when said lower legs are in said first workmode condition, contacting the floor to support the workbench thereon;

said floor-contacting means defining a first floor-contact area and said free ends of said lower legs defining a second floor-contact area, said second area being substantially greater than said first area;

whereby said convertible support means is adapted to support said working surface at a first workmode height above the floor when said lower legs are in said first workmode condition and at a second workmode height above the floor when said lower legs are in said second workmode condition, said horizontal surface serving, when said lower legs are in said second workmode condition, as a step intermediate in height between the floor and said working surface upon which the user can stand above the floor in front of said front vise member and upon which the user can place his foot and apply downwardly stabilizing forces on said intermediate structure to stabilize thereby the entire workbench in said second workmode condition.

10. The workbench of claim 9, wherein:

said collapsible supporting structure includes two front upper legs and two rear upper legs, each of which extends between said top structure and said support means at an acute sloping angle from the vertical when said collapsible supporting structure is in said erected condition; and each of said legs of said lower structure in the extended position thereof extends downwardly to the floor at an angle with the vertical which is greater than that of said each upper leg.

11. A collapsible, dual-height workbench adapted to be erected in a free-standing manner on a floor, comprising:

a top structure, including (a) front and rear vise members, each having a laterally elongated vertical clamping face and an upper work surface, said vise members being disposed side-by-side with the clamping faces opposed, and (b) a pair of laterally-spaced vise operating devices for moving said vise members relating together and apart to form a vise;

convertible support means, including (a) a front portion and a rear portion, said front portion including a laterally extending front cross member having a step surface below and parallel to said top structure and extending at least partly forward of the vertical projection of the front edge of said front vise member, said rear portion including a laterally extending rear cross member, and (b) a set of feet upon which the support means can stand on the floor in a first workmode condition;

a foldable supporting structure connected to said top structure and to said support means, said foldable structure being foldable between (a) said first workmode condition in which said front and rear cross members are horizontally spaced apart in the front-to-rear direction and said top structure is supported at an elevation higher than the elevation of said support means, which lies adjacent the floor level, and (b) a storage condition in which said front and rear portions of said support means and said top structure lie in substantially parallel juxtaposed planes;

said convertible support means further including a front pair of legs and a rear pair of legs pivotally connected for movement between (a) an extended position in which they support said step surface above the floor in an alternative workmode condition, wherein said support means supports said foldable supporting structure and said top structure such that said step surface is intermediate in height between the floor and the top structure, and (b) a retracted position in which said legs are retracted above said first set of feet in said first workmode condition;

said front pair of legs, in the extended position thereof, being laterally interconnected and supported against lateral separation of the pivotal connection points thereof by said front cross member, and said rear pair of legs, in the extended position thereof, being laterally interconnected and supported against lateral separation of the pivotal connection points thereof by said rear cross member;

each of said front and rear legs having a lower free end terminating in a floor contacting foot arranged to contact the floor in said second workmode condition, said feet on said legs comprising a second set of feet;

said first set of feet defining a first floor-contact area;

said second set of feet in the extended position of said legs defining a second floor-contact area, said second area being substantially greater than said first area.

12. The workbench of claim 11 wherein:
said foldable supporting structure includes a front pair of upper legs and a rear pair of upper legs;
said front pair of upper legs being pivotally connected at front upper pivots on upper regions thereof to said top structure and interconnected at lower regions thereof by said front portion of said convertible support means;
said rear pair of legs being pivotally connected at rear upper pivots on upper regions thereof to said top structure and interconnected at lower regions thereof by said rear portion of said convertible support means; and
said front upper pivots are located forward of said rear upper pivots.

13. A dual-height, portable workbench adapted to be erected in a free-standing manner on a floor, comprising:
a top structure, including (a) a pair of vise members having laterally elongated clamping faces and upper surfaces lying in substantially the same plane to form a working surface and (b) vise operating means operatively connected between said vise members to cause relative movement of the vise members towards and away from one another to form a vise;
understructure lying beneath and supporting said top structure and including (a) front and rear frames each having a pair of spaced generally upright legs, (b) a laterally extending horizontal foot-thrust member extending between the legs of the front frame, and (c) a set of lower legs which are retractable between lowered and raised conditions to position the top structure working surface at workbench and sawhorse heights, respectively, above the floor, the legs in the retracted condition lying substantially horizontal at a level just below the level of the foot-thrust member.

14. The workbench of claim 13, wherein:
said understructure further comprises a laterally extending member extending between lower regions of the legs of the rear frame;
said front and rear frames diverge from the vertical by less than a first angle; and
said lower legs, in the lowered condition thereof, extend downward from front and rear connections on said horizontal foot thrust member and said rear cross member, respectively, and diverge from the vertical by more than said first angle.

15. A workbench as claimed in claim 13 wherein each vise member has a plurality of spaced bores opening through its upper surface, each of said bores being adapted to receive snugly a rotatable abutment member having a workpiece-engaging surface lying above the upper surface of the vise member.

16. A collapsible, dual-height workbench adapted to be erected in a free-standing manner on a floor, comprising:
a worktable, including (a) front and rear vise members lying side-by-side, each vise member having a laterally elongated vertical clamping face, and (b) two vise operating devices spaced apart laterally along said clamping faces for moving said vise members relatively together and apart to form a vise;
a top bearing structure carrying said worktable;
a collapsible supporting structure carrying the top bearing structure, said supporting structure including (a) an upper structure including front and rear supporting frames each formed of a pair of laterally separated legs, the lower portions of the legs in each pair being interconnected by laterally extending base structure, said upper structure further including floor-contacting means on which the workbench rests in a first working height configuration of the worktable, and (b) a lower structure including four lower legs connected to the upper structure and adapted to be moved between an extended position relative to the upper structure, wherein said lower structure supports the workbench in a second working height configuration of the workable, and a retracted position, wherein said four lower legs lie generally parallel and adjacent to said base structure.

17. The workbench of claim 16 wherein the legs of said lower supporting structure are pivotally connected to said base structure adjacent the lateral ends thereof for pivoting between said extended position, wherein they slope downwardly and outwardly from said base structure, and said retracted position, wherein they lie generally horizontal and below the level of said base structure.

18. A collapsible, dual-height workbench adapted to be erected in a free-standing manner on a floor, comprising:
a vise unit having two elongate members as clamping jaws, at least one of which is movable with respect to the other member by means of spaced operating devices, and the top surfaces of which are situated substantially in the same plane and form the workbench worktop;

a collapsible supporting structure, including a top supporting structure having spaced support elements whose top ends are pivotally connected to the vise unit and whose bottom ends are connected to footed base parts, on which the worktop is supported in a first working height position, and which can be folded to a collapsed state wherein the worktop, support elements and base parts occupy substantially less volume than they do in said first working height position; and a plurality of lower support legs pivotally connected to the base parts and pivotable between an extended position, wherein they support the worktop in a second working height position of the worktop, and an inwardly-folded horizontal position adjacent the base parts, wherein said workbench is in said first working height position.

19. The workbench of claim 18, wherein the lower legs in the extended position extend downwards and obliquely outwards from the base parts, and the area bounded by straight lines connecting the lower ends of the lower legs is substantially greater in the second working height position than the area bounded by straight lines connecting the feet on the base parts in the first working height position.

20. The workbench of claim 18 wherein each elongate member has a plurality of spaced bores opening through its upper surface, each of which is adapted to receive snugly a rotatable abutment member having a workpiece-engaging surface lying above the upper surface of said elongate member.

21. A collapsible workbench, movable between a collapsed condition and two erected conditions of sawhorse height and workbench height, respectively, comprising:

a horizontally extending top structure including front and rear vise members lying side-by-side, each having a laterally elongated vertical clamping face and a flat top surface, together affording an upwardly facing work surface in both of said erected conditions;

front and rear upright frameworks each including two laterally separated legs connected by hinge connections to said top structure for supporting the top structure, said hinge connections defining four substantially horizontal laterally extending parallel pivotal axes, the pivotal axes on one framework being lower than the axes on the other framework;

front base structure connected to and interconnecting lower portions of the legs of the front framework, and rear base structure connected to and interconnecting lower portions of the legs of the rear framework, said front base structure including a load-bearing surface substantially parallel to said work surface and positioned at a distance therebelow equal to sawhorse height and at least partially forwardly of the front edge of said front vise member, to enable a person to stand in front of the top structure upon said load-bearing surface in either erected condition to stabilize the whole workbench;

said top structure and said front and rear frameworks enclosing a substantially lesser volume in the collapsed condition of said workbench than in either erected condition thereof;

two lower legs hinged to each of said front and rear base structures, one adjacent each lateral end thereof and pivotally foldable up therebeneath from an extended position to a retracted substantially horizontal position, independently of said frameworks, to enable said workbench to stand, selectively, at either of two erected conditions:
 (1) with said lower legs in said retracted position and said load-bearing surface adjacent floor level so as to support said top structure with said working surface at sawhorse height, and
 (2) with said lower legs extended down and out from said base structures in said extended position so as to support said load-bearing surface at an elevated level above the floor and support said top structure with said work surface at workbench height above the floor.

22. The workbench of claim 21, wherein:
said front and rear frameworks rotate in the same direction with respect to the top structure when moving from a collapsed to an erected condition; and the hinge axis of each of at least two of said lower legs is transverse to the hinge axes of the other lower legs, such that the direction of rotation of each of said at least two lower legs, when moving between said retracted position and said extended position is transverse to the direction of rotation of each of said other lower legs when moving between said retracted position and said extended position.

23. A collapsible, combined workbench and sawhorse adapted to be erected in a free-standing manner on a floor, comprising:

a top structure, including a pair of members together forming a vise, which in the erected condition of the workbench have upper surfaces lying in substantially the same plane to form a working surface, and vise operating means for causing relative movement of the vise members towards and away from one another; and understructure, including front support means and rear support means for, in the erected condition of the workbench, positioning the working surface at substantially normal workbench height above the floor, the front support means including a pair of laterally spaced upper leg portions hingeably connected to the top structure for pivoting about a first axis between an erected condition, in which said upper leg portions depend generally downwardly from said top structure, and a collapsed condition, in which said upper leg portions extend generally parallel to said working surface in juxtaposition to said top structure;

said understructure further including a crossmember connected to and extending laterally between said upper leg portions adjacent the lower ends thereof and which, in the erected condition of the workbench, is positioned at least in part in front of the working surface at a height above the floor substantially equal to the differential between normal workbench and sawhorse heights;

said front support means further including a pair of lower leg portions connected at the upper ends thereof to the cross member and extending downwardly therefrom with the lower ends of the lower leg portions acting as floor contacting feet which are at least in part disposed outside of the vertical projection of said crossmember, said floor contacting feet in the erected condition of said workbench contacting the floor at a position forward of said top structure;

said rear support means including a pair of laterally spaced leg portions hingeably connected to said top structure for pivoting about a second axis between an erected condition, in which said rear leg portions extend generally downwardly from said top structure, and a collapsed condition, in which said rear leg portions extend generally parallel to said working surface in juxtaposition to said top structure, said rear leg portions further including a pair of floor contacting feet which in the erected condition of the workbench engage the floor at a position to the rear of said top structure;

said first and second pivotal axes being disposed at different distances from the plane of the working surface such that said front upper leg portions and said rear leg portions fold into a compact configuration when moved from an erected condition to a collapsed condition.

24. A collapsible, combined workbench and sawhorse adapted to be erected in a free-standing manner on a floor, comprising:

a top structure, including (a) front and rear laterally elongated vise members having upper surfaces defining a substantially planar working surface and (b) a pair of spaced hand-operable devices for moving said vise members towards and away from one another in the plane of said working surface to form a vise;

collapsible leg means, including laterally spaced-apart front legs and laterally spaced-apart rear legs, pivotally connected to said top structure for folding relative thereto between an erected condition, in which said leg means extend downward from said top structure and support said working surface in a substantially horizontal plane at substantially normal workbench height above the floor, and a storage condition, in which said leg means extend generally parallel to said working surface in juxtaposition to said top structure to form a compact storage configuration; and cross member means connected to and extending laterally between said front legs for providing, when said leg means are in the erected condition, a generally horizontal foot surface which is located at least in part forwardly of the front edge of said front vise member and which is spaced vertically below said working surface by a distance substantially equal to normal sawhorse height, whereby said working surface in the erected condition of said leg means is at normal workbench height relative to a person standing on the floor and is at normal sawhorse height relative to a person standing on the foot surface, said leg means when in the erected condition including portions inclined downwardky and outwardly of said cross member means so as to define a floor contact area that is substantially larger than the horizontal cross-sectional area encompassed by said leg means and said cross member means at the level of said horizontal foot surface.

25. The combined workbench and sawhorse of claim 24 wherein each vise member has a plurality of spaced bores opening through its upper surface, each of which is adapted to receive snugly a rotatable abutment member having a workpiece-engaging surface lying above the upper surface of the vise member.

26. A collapsible, dual-height workbench comprising a top structure;

a convertible base means, includng front and rear laterally extending horizontal structures and a lower structure connected to said horizontal structures;

a collapsible supporting structure connected to said top structure and to said horizontal structures, and collapsible from a first workmode condition, in which the top surface of the top structure lies horizontally and is vertically spaced above the horizontal structures and the horizontal structures are adjacent floor level, to a storage condition, in which the top surface of the top structure and the base structures are vertically juxtaposed;

said collapsible supporting structure including a pair of frames pivoted to the top structure, and a pair of diagonal braces, one each on each lateral end of said workbench, and extending diagonally between said frames in said first workmode condition, and arranged to lie substantially parallel to said frames in said storage condition;

means for releasably holding said braces in their diagonal position to maintain said top structure vertically spaced above said horizontal structures;

said lower structure including four legs, each terminating in a footed free end and connected at the other end to said horizontal structures by pivotal connection means for folding between
  (a) an extended position in which said legs support said horizontal structures above the floor in an alternative second workmode condition, and
  (b) a folded position in which said legs lie tucked beneath said horizontal structures; and spring means for releasably holding said legs of said lower structure in said folded position.

27. A collapsible, dual-height workbench adapted to be erected in a free-standing manner on a floor, comprising:

a top structure including two elongate beams each having a plurality of spaced bores opening through its upper surface, each of said bores being adapted to receive snugly a rotatable abutment member having a workpiece-engaging surface lying above the upper surface of the beam;

a collapsible supporting structure including two front legs and two rear legs connected to the top structure for folding between a collapsed condition and an erected condition;

first floor-contacting means connected to the lower ends of said rear legs for supporting said rear legs over the floor when said collapsible supporting structure is in the erected condition;

second floor-contacting means connected to the lower ends of said front legs for supporting said front legs over the floor when said collapsible supporting structure is in the erected condition;

said first and second floor-contacting means including first and second pairs, respectively, of lower legs, said first and second pairs of lower legs being mounted for pivotal movement about the upper ends thereof between a retracted condition, in which said first and second floor-contacting means support said top structure at substantially sawhorse height above the floor, and an extended condition, in which said first and second floor-contacting means support said top structure at substantially full workbench height above the floor.

28. A collapsible, combined workbench and sawhorse adapted to be errected in a free-standing manner on a floor, comprising:
a top structure, including two elongated beams having upper surfaces defining a substantially planar working surface and a pair of spaced hand-operable devices for moving said beams towards and away from one another in the plane of said working surface to form a vise;
collapsible leg means pivotally connected to said top structure for folding relative thereto between an erected condition, in which said leg means extend generally toward from said top structure and support said working surface in a substantially horizontal plane at substantially full workbench height above the floor, and a storage condition, in which said leg means extend generally parallel to said working surface in juxtaposition to said top structure to form a compact storage configuration;
platform means pivotally connected to said leg means for folding relative thereto between a use position, when said leg means are in the erected condition, in which said platform means defines a generally horizontal foot platform which is located at least in part forwardly of a plan projection of said working surface and which is at a height above the floor substantially equal to the differential between sawhorse height and full workbench height, and a storage position, when said leg means are in the storage condition, in which said platform means extends generally parallel to said leg means;
said collapsible leg means including (a) upper leg means extending between said top structure and said platform means for, when said collapsible leg means are in said erected condition, suporting said top structure at substantially sawhorse height above said foot platform, and (b) lower leg means pivotally connected at the upper ends thereof to said platform means for folding relative to said platform means between an extended position, when said collapsible leg means are in said erected condition, in which said lower leg means contact the floor and cooperate in supporting said working surface at full workbench height above the floor, and a retracted position, in which said lower leg means extend generally parallel to said platform means; and
said platform means including floor-contacting means for, when said lower leg means are in the retracted condition, supporting said work surface at substantially sawhorse height above the floor, with said platform means then acting as a substantially floor-level base.

29. The combined workbench and sawhorse of claim 28 wherein said lower leg means, when in said extended position, define a floor-contact area of substantially larger size than the floor-contact area defined by the floor-contacting means of said platform means when said lower leg means are in said retracted position.

30. a dual-height, collapsible workbench comprising: top, intermediate, and lower structures;
said top structure incorporating (1) two elongate members having upper surfaces which lie in substantially the same plane to form a working surface and which are adjustably movable relative to one another in the transverse direction to form an elongate gap therebetween, (2) means carried at least in part by each of said elongate members for gripping a workpiece therebetween, and (3) means for adjustably moving said elongate members relative to one another to enable gripping of a workpiece between said gripping means;
a foldable supporting structure arranged, in an erected condition, to maintain the top and intermediate structures separated in a first workmode condition with the intermediate structure acting as a floor-level base;
said lower structure incorporating legs which are retractable by pivoting inwardly under the intermediate structure in said first workmode condition, but which, when extended, are adapted to maintain the to and intermediate structures spaced above the floor in an alternative second workmode condition.

31. The workbench of claim 30 wherein said gripping means includes a plurality of spaced bores opening through the upper surface of each elongate member, each of which bores is adapted to receive snugly a rotatable abutment member having a workpiece-engaging surface lying above the upper surface of the member.

32. The workbench of claim 30 wherein the intermediate structure includes a platform which, in the erected condition of the foldable structure, is at least partly disposed in front of the top structure.

33. A collapsible, dual-height workbench adapted to be erected in a free-standing manner on a floor, comprising:
a top structure providing a working surface;
convertible support means, including intermediate structure and lower structure;
a collapsible supporting structure interconnecting said top structure and said convertible support means and extensible between a storage condition, in which the top and intermediate structures lie in juxtaposed planes, and an erected condition, in which the top and intermediate structures are vertically spaced apart with the intermediate structure adjacent the floor level and the working surface lying in a substantially horizontal plane above said intermediate structure;
said intermediate structure including means providing, when said collapsible supporting structure is in said erected condition, a substantially horizontal surface lying at least partly forward of the vertical projection of the front edge of the top structure and adapted for the user to place his foot thereupon to stabilize with his weight the workbench in said erected condition;
said lower structure including a plurality of legs, each pivotally attached at one end to said intermediate structure and each having at the other end thereof a floor-contacting free end, said legs depending from said intermediate structure and being foldable between a first workmode condition, in which the free ends of said legs are folded up beneath said intermediate structure out of contacting relation with the floor, and a second workmode condition in which the free ends of said legs are folded down from said intermediate structure to an extended position in which they are adapted to contact the floor to support the workbench thereon; and
means mounted on at least one of said intermediate structure and said lower structure for, when said lower legs are in said first workmode condition, contacting the floor to support the workbench thereon;

said floor-contacting means defining a first floor-contact area and said free ends of said lower legs defining a second floor-contact area, said second area being substantially greater than said first area;

whereby said convertible support means is adapted to support said working surface at a first workmode height above the floor when said lower legs are in said first workmode condition and at a second workmode height above the floor when said lower legs are in said second workmode condition; said horizontal surface serving, when said lower legs are in said second workmode condition, as a step intermediate in height between the floor and said working surface upon which the user can stand above the floor in front of said top structure and upon which the user can place his foot and apply downwardly stabilizing forces on said intermediate structure to stabilize thereby the entire workbench in said second workmode condition.

34. A dual-height, portable workbench adapted to be erected in a free-standing manner on a floor, comprising:

a top structure, including (a) means defining a laterally elongaged working surface and (b) means defining a vise structure for gripping workpieces;

understructure lying beneath and supporting said top structure and including (a) front and rear frames each having a pair of spaced generally upright legs, (b) a laterally extending horizontal foot-thrust member extending between the legs of the front frame, and (c) a set of lower legs which are retractable between lowered and raised conditions to position the top structure working surface at workbench and sawhorse heights, respectively, above the floor, the legs in the retracted condition lying substantially horizontal at a level just below the level of the foot-thrust member.

35. A workbench as claimed in claim 34 wherein said top structure further includes means defining a plurality of spaced bores opening upward through said working surface, each of said bores being adapted to receive snugly a rotatable abutment member having a workpiece-engaging surface lying above said working surface.

36. A collapsible, dual-height workbench adapted to be erected in a free-standing manner on a floor, comprising:

a worktop structure, including two elongate members which are positionable in spaced-apart relation in the transverse direction to form an elongate gap therebetween and the upper surfaces of which are situated substantially in the same plane and form the workbench worktop;

a collapsible supporting structure, including a top supporting structure having spaced support elements whose upper ends are pivotally connected to the worktop structure and whose lower ends are connected to footed base parts, on which the worktop structure is supported in a first working height position, and which can be folded to a collapsed state wherein the worktop structure, support elements and base parts occupy substantially less volume than they do in said first working height position; and a plurality of lower support legs pivotally connected to the base parts and pivotable between an extended position, wherein they support the worktop in a second working height position of the worktop, and an inwardly-folded horizontal position adjacent the base parts, wherein said workbench is in said first working height position.

37. A collapsible, combined workbench and sawhorse adapted to be erected in a free-standing manner on a floor, comprising:

a top structure including front and rear, laterally elongated top members having upper surfaces providing a working surface;

collapsible support means connected to said top structure for folding relative thereto between (1) an erected condition, in which said support means extends generally downward from said top structure and supports said working surface in a substantially horizontal plane at substantially full workbench height above the floor, and (2) a storage condition, in which said support means extends generally parallel to said working surface in juxtaposition to said top structure to form a compact storage configuration;

said collapsible support means including front leg means and rear leg means, each having a pair of laterally spaced-apart upper leg parts which are pivotally connected at the upper ends thereof to said bench top structure and which lie entirely within the lateral ends of said top members;

each of said front leg means and said rear leg means further having a pair of laterally spaced-apart lower leg parts which are splayed relative to the respective upper leg parts, at least said front lower leg parts being splayed in the lateral direction to extend laterally beyond the lateral ends of said top members; and said collapsible support means further includes a cross member connected to and extending laterally of said front leg means for providing, when said support structure is in the erected condition, a generally horizontal foot surface which is located at least in part forwardly of the front edge of said front top member and which is spaced vertically below said working surface by a distance substantially equal to normal sawhorse height, whereby said working surface in the erected condition of said collapsible support means is at full workbench height relative to a person standing on the floor and is at normal sawhorse height relative to a person standing on the foot surface.

38. The combined workbench and sawhorse of claim 37 wherein each top member has a plurality of spaced bores opening through its upper surface, each of which is adpated to receive snugly a rotatable abutment member having a workpiece-engaging surface lying above the upper surface of the vise member.

39. A collapsible, combined workbench and sawhorse adapted to be erected in a free-standing manner on a floor, comprising:

a top structure, including laterally elongated front and rear beams having upper surfaces defining a working surface;

collapsible leg means, including laterally spaced-apart front legs and laterally spaced-apart rear legs, connected to said top structure for folding relative thereto between an erected condition, in which said leg means extend generally downward from said top structure and support said working surface in a substantially horizontal plane at substantially full workbench height above the floor, and a storage condition, in which said leg means extend generally parallel to said working surface in juxtaposition to said top structure to form a compact storage configurtion; and platform means pivotally connected to and extending laterally between said spaced-apart front legs for folding relative thereto between a use position, when said leg means are in the erected condition, in which said platform means defines a generally horizontal foot platform which is located at least in part forwardly of a plan projection of said working surface and which is at a height above the floor substantially equal to the differential between sawhorse height and full workbench height, and a storage position, when said leg means are in the storage condition, in which said platform means extends generally parallel to said leg means.

40. The combined workbench and sawhorse of claim 39 wherein each of said front and rear beams has a plurality of spaced bores opening through the upper surface thereof, each of which is adapted to receive snugly a rotatable abutment member having a workpiece-engaging surface lying above the upper surfaces of said beams.

41. A collapsible, combined workbench and sawhorse adapted to be erected in a free-standing manner on a floor, comprising:

a top structure, including means defining a laterally elongated working surface;

collapsible leg means, including laterally spaced-apart front legs and laterally spaced-apart rear legs, pivotally connected to said top structure for folding relative thereto between an erected condition, in which said leg means extend downward from said top structure and support said working surface in a substantially horizontal plane at substantially normal workbench height above the floor, and a storate condition, in which said leg means extend generally parallel to said working surface in justaposition to said top structure to form a compact storage configuration; and cross member means connected to and extending laterally between said front legs for providing, when said leg means are in the erected condition, a generally horizontal foot surface which is located at least in part forwardly of the front edge of said working surface and which is spaced vertically below said working surface by a distance substantially equal to normal sawhorse height, whereby said working surface in the erected condition of said leg means is at normal workbench height relative to a person standing on the floor and is at normal sawhorse height relative to a person standing on the foot surface.

42. The combined workbench and sawhorse of claim 41 wherein said working surface defining means comprises front and rear, laterally elongated beams and means for positioning said beams in said top structure in front-to-rear, spaced-apart relationship.

43. The combined workbench and sawhorse of claim 42 wherein said working surface defining means includes means defining a plurality of spaced bores opening upward through said working surfaces, each of said bores being adapted to receive snugly a rotatable abutment member having a workpiece-engaging surface lying above said working surface.

44. The workbench of claim 19 wherein said vise-operating devices include means for selectively adjusting the angular position of one elongate member relative to the other elongate member in the plane of said working surface, whereby the abutment member or members in said one elongate member may be moved angularly with respect to the abutment member or members in said other elongate member so as to facilitate the gripping therebetween of irregularly-shaped workpieces.

45. The combined workbench and sawhorse of claim 8 wherein said hand-operable devices include means for selectively adjusting the angular position of one elongate beam relative to the other elongate beam in the plane of said working surface, whereby the abutment member or members in said one elongate beam may be moved angularly with respect to the abutment member or members in said other elongate beam so as to facilitate the gripping therebetween of irregularly-shaped workpieces.

46. The workbench of claim 9 wherein:

each of said vise members has a plurality of spaced bores opening through the upper surface thereof, each of which bores is adapted to receive snugly a rotatable abutment member having a workpiece-engaging surface lying above the upper surface of the vise member;

said top structure further includes means for selectively adjusting the angular position of one vise member relative to the other vise member in the plane of said working surface, whereby the abutment member or members in said one vise member may be moved angularly with respect to the abutment member or members in said other vise member so as to facilitate the gripping therebetween of irregularly-shaped workpieces.

47. The workbench of claim 11 wherein:

each of said vise members has a plurality of spaced bores opening through its upper surface, each of which is adapted to receive snugly a rotatable abutment member having a workpiece-engaging surface lying above the upper surface of the vise member; and said vise operating devices include means for selectively adjusting the angular position of one vise member relative to the other vise member such that the abutment member or members in said one vise member may be moved angularly with respect to the abutment member or members in said other vise member so as to facilitate the gripping therebetween of irregularly-shaped workpieces.

48. The workbench of claim 15 wherein said vise operating means includes means for selectively adjusting the angular position of one vise member relative to the other vise member in the plane of said working surface, whereby the abutment member or members in said one vise member may be moved angularly with respect to the abutment member or members in said other vise member so as to facilitate the gripping therebetween of irregularly-shaped workpieces.

49. The workbench of claim 16 wherein:

each vise member has a plurality of spaced bores opening through the upper surface thereof, each of which is adapted to receive snugly a rotatable abutment member having a workpiece-engaging surface lying above the upper surface of the vise member; and said vise-operating devices include means for selectively adjusting the angular position of one vise member relative to the other vise member such that the abutment member or members in said one vise member may be moved angularly with respect to the abutment member or members in said other vise member so as to facilitate the gripping therebetween of irregularly-shaped workpieces.

50. The workbench of claim 20 wherein said vise unit includes means for selectively adjusting the angular position of one elongate member relative to the other elongate member in the plane of said working surface, whereby the abutment member or members in said one elongate member may be moved angularly with respect to the abutment member or members in said other elongate member so as to facilitate the gripping therebetween of irregularly-shaped workpieces.

51. The combined workbench and sawhorse of claim 25 wherein said hand-operable devices include means for selectively adjusting the angular position of one vise member relative to the other vise member in the plane of said working surface, whereby the abutment member or members in said one vise member may be moved angularly with respect to the abutment member or members in said other vise member so as to facilitate the gripping therebetween of irregularly-shaped workpieces.

52. The workbench of claim 49 wherein said top structure include means for selectively adjusting the angular position of one elongate member relative to the other elongate member in the plane of said working surface, whereby the abutment member or members in said one elongate member may be moved angularly with respect to the abutment member or members in said other elongate member so as to facilitate the gripping therebetween of irregularly-shaped workpieces.

* * * * *

UNITED STATES PATENT AND TRADEMARK OFFICE
CERTIFICATE OF CORRECTION

PATENT NO. : 4,159,821
DATED : July 3, 1979
INVENTOR(S) : Ronald Price Hickman

It is certified that error appears in the above-identified patent and that said Letters Patent are hereby corrected as shown below:

Column 2, line 13, after "invention" insert a comma;
Column 3, line 39, "leg 49" should read --leg 40--;
Column 4, line 18, "frame" should read --frames--;
Column 10, line 40, "extends" should read --extending--;
Column 10, line 42, "each upper leg" should read --upper legs--;
Column 10, lines 43-45, "A collapsible, dual-height workbench adapted to be erected in a freestanding manner on a floor, comprising:"should read --A workbench, comprising:--;
Column 10, line 52, "relating" should read --relatively--;
Column 10, line 55, before "laterally" insert --horizontal,--;
Column 10, line 57, "partly" should read --partially--;
Column 10, line 59, before "said" insert --and-- and before "laterally" insert --horizontal,--;
Column 10, line 61, "which the" should read --which said-- and delete "on the floor";
Column 15, line 59, "downwardky" should read --downwardly--;
Column 17, line 4, "errected" should read --erected--;
Column 17, line 15, "toward" should read --downward--;
Column 17, line 62, "a" should read --A--;

UNITED STATES PATENT AND TRADEMARK OFFICE
CERTIFICATE OF CORRECTION

PATENT NO. : 4,159,821
DATED : July 3, 1979
INVENTOR(S) : Ronald Price Hickman

It is certified that error appears in the above–identified patent and that said Letters Patent are hereby corrected as shown below:

```
Column 18, line 16, "the to" should read --the top--;
Column 20, line 53, "adpated" should read --adapted--;
Column 21, line 40, "storate" should read --storage--;
Column 21, lines 41 & 42, "justaposition" should read
    --juxtaposition--;
Column 22, line 1, "claim 19" should read --claim 3--; and
Column 24, line 10, "claim 49" should read --claim 31--.
```

Signed and Sealed this

Eighteenth Day of March 1980

[SEAL]

Attest:

SIDNEY A. DIAMOND

Attesting Officer

Commissioner of Patents and Trademarks